US011661026B2

(12) United States Patent
Jo

(10) Patent No.: US 11,661,026 B2
(45) Date of Patent: May 30, 2023

(54) CENTER SIDE AIRBAG

(71) Applicant: HYUNDAI MOBIS CO., LTD., Seoul (KR)

(72) Inventor: Kum Ho Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/664,367

(22) Filed: May 20, 2022

(65) Prior Publication Data
US 2022/0410836 A1    Dec. 29, 2022

(30) Foreign Application Priority Data
Jun. 24, 2021   (KR) .......................... 10-2021-0082465

(51) Int. Cl.
*B60R 21/231*   (2011.01)
(52) U.S. Cl.
CPC ............... *B60R 21/23138* (2013.01); *B60R 2021/23161* (2013.01)
(58) Field of Classification Search
None
See application file for complete search history.

(56) References Cited

U.S. PATENT DOCUMENTS

| | | | |
|---|---|---|---|
| 8,414,018 B2* | 4/2013 | Choi | B60R 21/23138 280/729 |
| 10,543,800 B2* | 1/2020 | Kwon | B60R 21/207 |
| 11,292,419 B2* | 4/2022 | Wiik | B60R 21/23138 |
| 11,491,946 B2* | 11/2022 | Azuma | B60R 21/23138 |
| 11,505,158 B2* | 11/2022 | Choi | B60R 21/207 |
| 2011/0309603 A1* | 12/2011 | Choi | B60R 21/231 280/729 |
| 2017/0232922 A1* | 8/2017 | Wiik | B60R 21/237 280/730.2 |
| 2021/0170978 A1* | 6/2021 | Acker | B60R 21/23138 |

FOREIGN PATENT DOCUMENTS

KR     2012-0051279     5/2012

* cited by examiner

*Primary Examiner* — Faye M Fleming
(74) *Attorney, Agent, or Firm* — DLA Piper LLP (US)

(57) ABSTRACT

A center side airbag configured to reduce spacing between an airbag cushion and a passenger in a front passenger seat to safely restrict transverse movement of the passenger in the front passenger seat. The center side airbag includes an airbag cushion configured to be unfolded between a driver seat and a front passenger seat, and a protruding chamber configured to be unfolded by a front passenger seat-side portion of the airbag cushion protruding toward a passenger in the front passenger seat.

10 Claims, 4 Drawing Sheets

CENTER SIDE AIRBAG

CROSS REFERENCE TO RELATED APPLICATION

The present application claims priority to Korean Patent Application No. 10-2021-0082465, filed Jun. 24, 2021, the entire contents of which is incorporated herein for all purposes by this reference.

BACKGROUND OF THE INVENTION

Field of the Invention

The present invention relates generally to a center side airbag configured to reduce spacing between an airbag cushion and a passenger in a front passenger seat to safely restrict transverse movement of the passenger in the front passenger seat.

Description of the Related Art

A center side airbag restricting transverse movement of a passenger in the vehicle room is supported by a center console or is unfolded between a driver and a passenger in a front passenger seat and is supported therebetween. Therefore, the center side airbag prevents not only a collision between passengers but also a secondary collision between the passengers.

However, in an actual collision of a vehicle, since the thickness of an airbag cushion of the center side airbag is insufficient in comparison to spacing between the head of the driver and the head of the passenger in the front passenger seat, movement of the head of the passenger in the front passenger seat is not restricted due to the spacing, causing a problem in that the protection effect for the passenger in the front passenger seat is reduced.

The foregoing described as the controller and the controlling method of operating a fuel cell is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problem occurring in the related art, and the present invention is intended to provide a center side airbag configured to reduce spacing between an airbag cushion and a passenger in a front passenger seat, thereby safely restricting transverse movement of the passenger in the front passenger seat.

In order to achieve the above objective, according to one aspect of the present invention, there is provided a center side airbag including: an airbag cushion configured to be unfolded between a driver seat and a front passenger seat; and a protruding chamber configured to be unfolded by a front passenger seat-side portion of the airbag cushion protruding toward a passenger in the front passenger seat.

The protruding chamber may be configured to be unfolded toward the head part of the passenger in the front passenger seat.

The protruding chamber may be configured such that a protruding volume thereof may be gradually reduced in a forward direction.

The protruding chamber may be configured to support the head part of the passenger in the front passenger seat and then guide the head part of the passenger in the front passenger seat to a front portion of the airbag cushion in response to a reduction form of the protruding volume of the protruding chamber.

The airbag cushion may consist of a front passenger seat-side side panel and a driver seat-side side panel that overlap each other, and the front passenger seat-side side panel may have a wider area than an area of the driver seat-side side panel, so that the protruding chamber may be folded toward the front passenger seat.

A portion of the front passenger seat-side side panel may be vertically folded; and in an unfolding process of the airbag cushion, a folded portion of the front passenger seat-side side panel may be unfolded to become the protruding chamber.

The protruding volume of the protruding chamber may be determined by a folded length the folded portion.

The folded portion may be located to connect a forefront portion to a rearmost portion of the airbag cushion.

The folded portion may be folded in a form in which a vertical length thereof may be gradually shortened in a rear to front direction.

The center side airbag may include a diffuser configured to distribute gas supplied into the airbag cushion in an unfolded direction of the airbag cushion; and an inactive area configured to be unfilled with gas, and to guide the gas distributed through the diffuser toward the protruding chamber.

The diffuser may be provided in a rear portion of a lower unfolded area of the airbag cushion; the protruding chamber may be provided in an upper unfolded area of the airbag cushion; and the inactive area may be formed in a vertical longitudinal direction at a center portion between the upper unfolded area and the lower unfolded area, and which may be configured to guide the gas distributed by the diffuser upward.

As described above, according to the present invention, the protruding chamber is provided at a portion of the airbag cushion toward the head of the front passenger seat, so that restriction of the transverse movement of the front passenger and quick supporting for the head of the front passenger are performed. Therefore, the front passenger is stably protected.

In addition, as the protruding volume of the protruding chamber is gradually reduced forward, the head of the front passenger is guided toward the front portion of the airbag cushion along the inclined surface of the protruding chamber. Accordingly, the protruding chamber restricts the head of the front passenger from falling behind the airbag cushion, thereby preventing a risk of a secondary collision between the driver and the front passenger.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
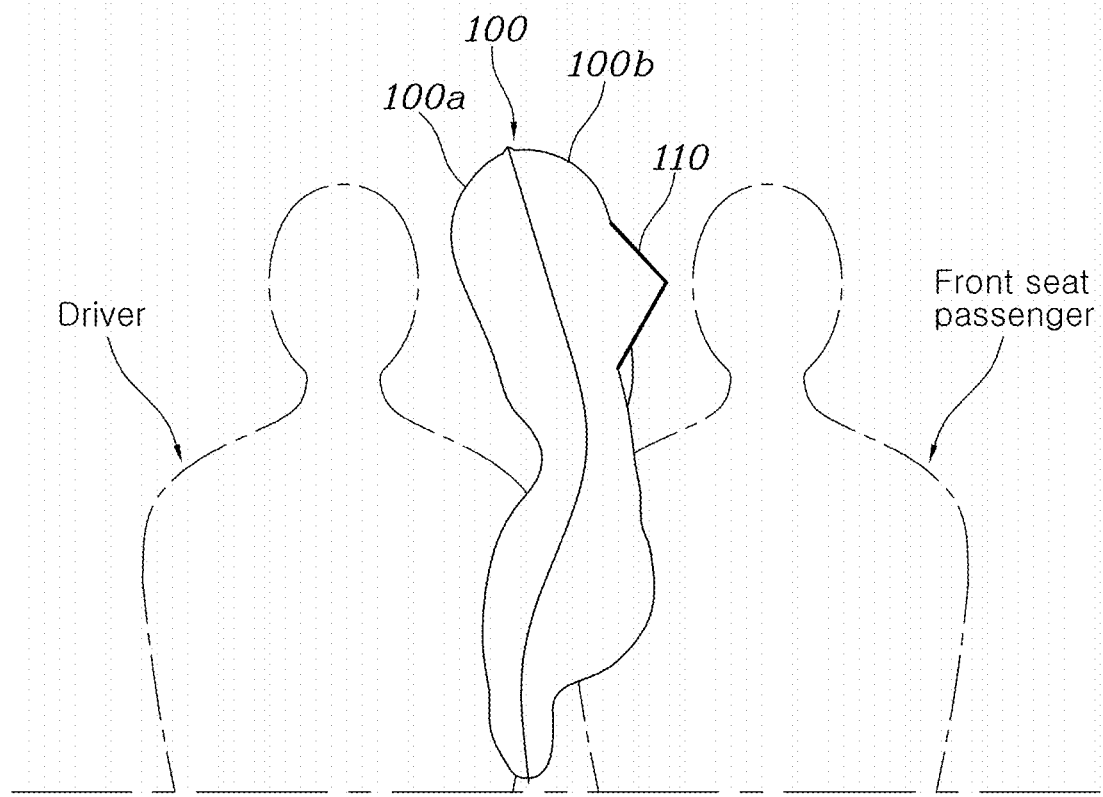
FIG. 1 is a view showing the unfolding form of a center side airbag according to the present invention.

In the following description, the structural or functional description specified to an exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

An exemplary embodiment of the present invention will be described with reference to accompanying drawings.

FIG. 1 is a view showing the unfolding form of a center side airbag according to the present invention.

Referring to the drawings, according to the present invention, the center side airbag includes: an airbag cushion 100 unfolded between a driver seat and a front passenger seat; and a protruding chamber 110 unfolded as a front passenger seat-side portion of the airbag cushion 100 protrudes toward a passenger in the front passenger seat (hereinbelow, which will be referred to as front passenger).

Specifically, the center side airbag is provided in an inner side of the front passenger seat and the airbag cushion 100 is unfolded upward between a driver and the front passenger seat. Then, as the airbag cushion 100 is supported by a center console, a collision between a driver and a front passenger is prevented in a vehicle collision.

Specifically, the airbag cushion 100 is provided to relatively further protrude at a front passenger seat-side portion thereof compared to a driver seat-side portion by the protruding chamber 110 provided at the front passenger seat-side portion. Thus, the spacing between the airbag cushion 100 and the front passenger seat is reduced.

Accordingly, as a spatial variation between the airbag cushion 100 and the front occupant is reduced, transverse movement of the front passenger is restricted and the front passenger is safely protected.

Specifically, according to the present invention, the protruding chamber 110 is configured to be unfolded toward the head of the front passenger.

In other words, when the head of the front passenger seat faces the airbag cushion 100 in response to a strong side collision of a vehicle, the head of the front passenger is further quickly supported by the protruding chamber 110 protruding toward the front passenger, so that a risk of injury caused by bending the front passenger's neck is prevented.

Moreover, the protruding chamber 110 is configured such that a protruding volume thereof is gradually reduced forward.

Figure 2:
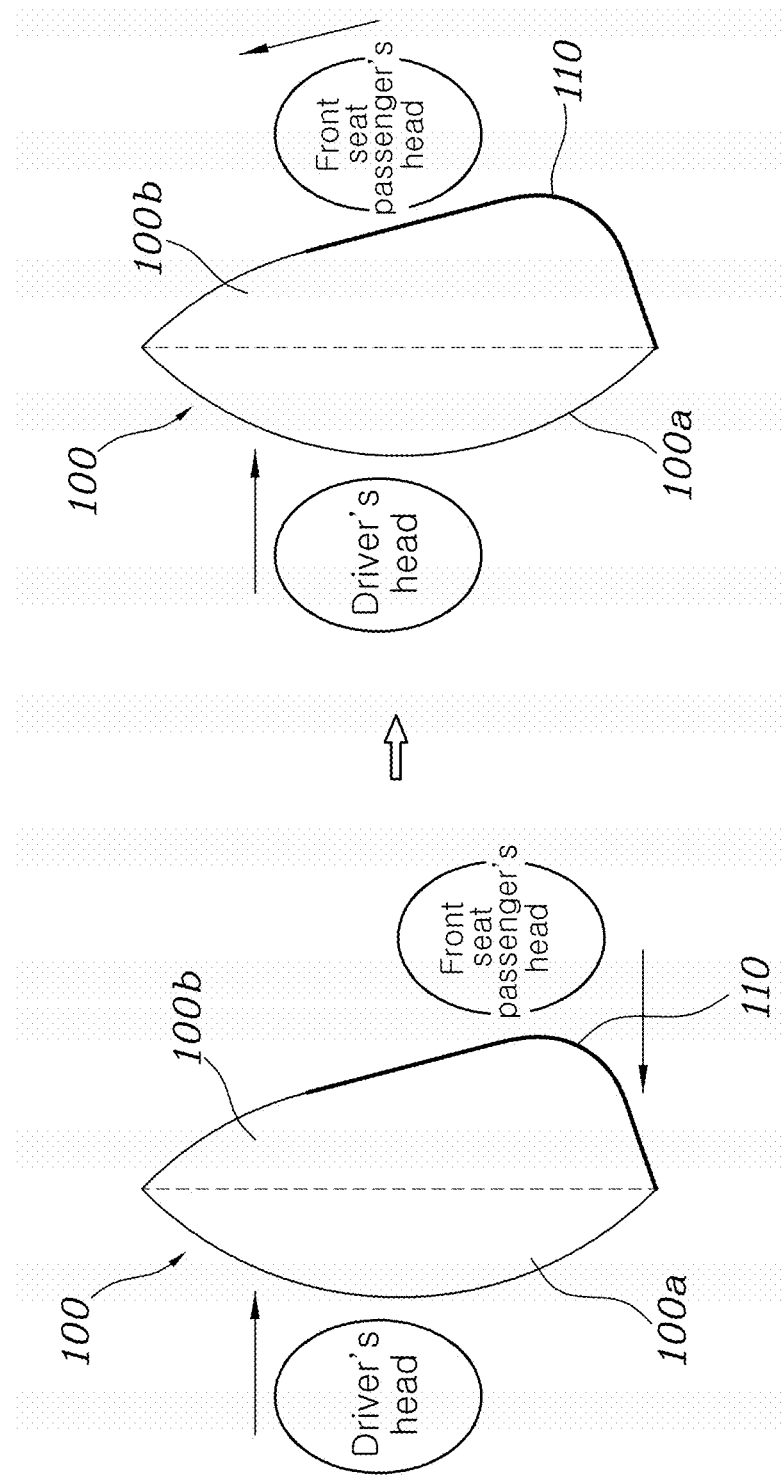
FIG. 2 is a top view showing movement of the head of a passenger in a front passenger seat supported by a protruding chamber of the present invention.

FIG. 2 is a top view showing movement of the front passenger in the front passenger seat supported by the protruding chamber 110 of the present invention. Referring to the drawing, the protruding chamber 110 provided at a front passenger seat-side side panel 100a of the airbag cushion 100 has an inclined outer surface, so that the protruding volume at a rear portion thereof on which the head of the front passenger is initially supported is the largest and the protruding volume at a front portion thereof is reduced. Therefore, the protruding volume is gradually reduced forward from the rear portion.

In other words, as shown in left drawing in FIG. 2, the head of the front passenger is supported on the rear portion of the protruding chamber 110 at an initial stage of a collision.

Then, depending on the shape of which the protruding volume of the protruding chamber 110 is reduced forward, as shown in right drawing in FIG. 2, the head of the front passenger is guided to the front portion of the airbag cushion 100 along the inclined surface of the protruding chamber 110.

Therefore, as falling of the head of the front passenger rearward of the airbag cushion 100 is prevented, the risk of a secondary collision between the driver and the front passenger is prevented.

Meanwhile, as an exemplary embodiment to unfold the front passenger seat-side portion of the airbag cushion 100 toward the front passenger seat, the center side airbag of the present invention is implemented by deforming the structure of the front passenger seat-side side panel 100a.

Figure 3:
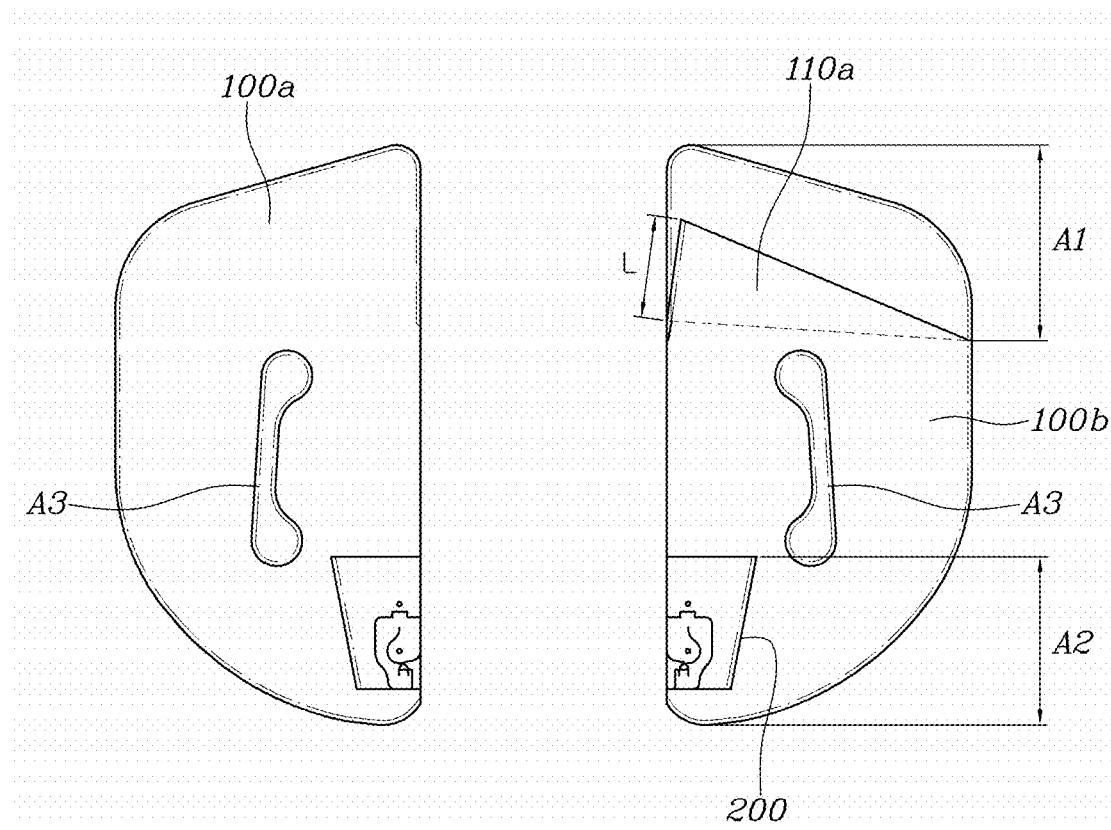
FIG. 3 is a view showing forms of a driver seat-side side panel and a front passenger seat-side side panel of an airbag cushion according to the present invention.
Figure 4:
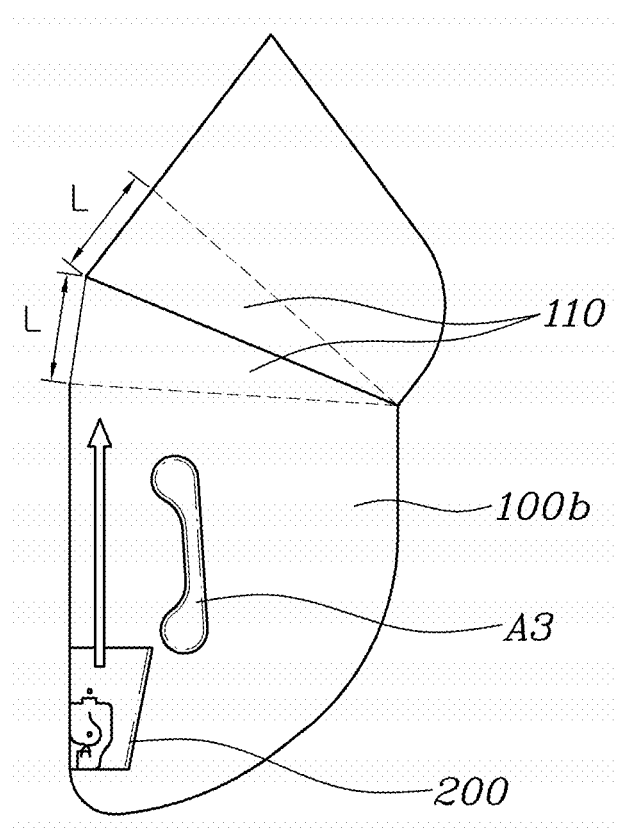
FIG. 4 is a view showing the form in which a protruding chamber is provided as a folded portion of the front passenger seat-side side panel in FIG. 3 is unfolded.

FIG. 3 is a view showing forms of a driver seat-side side panel 100b and the front passenger seat-side side panel 100a of the airbag cushion 100 according to the present invention. FIG. 4 is a view showing the form in which the protruding chamber 110 is provided as a folded portion 110a of the front passenger seat-side side panel 100a shown in FIG. 3 is unfolded.

Referring to the drawings, the airbag cushion 100 is configured the front passenger seat-side panel 100a and the driver seat-side side panel 100b overlapping each other. The front passenger seat-side side panel 100a has the area larger than the driver seat-side side panel 100b, so that the protruding chamber 110 is unfolded toward the front passenger seat.

In other words, an edge of the front passenger seat-side side panel 100a and an edge of the driver seat-side side panel 100b are sewn to form the airbag cushion 100, and the area of the front passenger seat-side side panel 100a is formed larger than the driver seat-side side panel 100b. Therefore, when the airbag cushion 100 is unfolded, as the area of the front passenger seat-side side panel 100a is formed larger, the front passenger seat-side portion of the airbag cushion is expanded further larger than the driver seat-side portion.

In order to form the area of the front passenger seat-side side panel 100a larger than the area of the driver seat-side side panel 100b, the center side airbag of the present invention is configured to provide the protruding chamber 110 such that a portion of the front passenger seat-side panel 100a is folded vertically; and in an unfolding process of the airbag cushion 100, the folded portion 110a of the front passenger seat-side side panel 100a is unfolded to become the protruding chamber 110.

In other words, as shown in FIG. 3, the driver seat-side side panel 100b does not have a folded portion, but the front passenger seat-side side panel 100a has the folded portion. Therefore, the area of the front passenger seat-side side panel 100a is formed larger than the area of the driver seat-side side panel 100b by the folded portion of the front passenger seat-side side panel 100a.

Therefore, when the airbag cushion 100 is unfolded, the folded portion is unfolded and expanded, so that the protruding chamber 110 may be provided at the front passenger seat-side portion of the airbag cushion.

In addition, according to the present invention, the protruding volume of the protruding chamber 110 is determined by a folded length L of the folded portion 110a.

For example, as shown in FIG. 3, the folded vertical length of the folded portion 110a is 'L'. As L is lengthened, the protruding volume of the protruding chamber 110 may be increased. On the contrary, as L is shortened, the protruding volume of the protruding chamber 110 may be reduced.

Therefore, the length of the folded portion 110a is designed in response to a specification of the airbag cushion 100 or a vehicle model, so that the protruding chamber 110 is preset with the optimal protruding volume suitable for the vehicle and thus safely protecting the passenger.

In addition, the folded portion 110a is located to connect a forefront portion to a rearmost portion of the airbag cushion.

Specifically, the folded portion 110a is folded such that the vertical length L thereof is gradually reduced forward from the rear portion.

As the folded portion 110a is folded in an inclined form such that the vertical length L thereof is gradually forward from the rear portion, the protruding volume of the protruding chamber 110 is also gradually reduced forward from the rear portion when the airbag cushion 100 is unfolded.

Therefore, as described above, in an initial stage of a vehicle collision, the head of the front passenger is supported by the rear portion of the protruding chamber 110, and then the protruding chamber 110 guides the head of the front passenger toward the front portion of the airbag cushion 100 along the inclined outer surface thereof. Accordingly, the protruding chamber restricts the head of the front passenger seat from falling behind the airbag cushion 100 and safely protects the passenger.

Meanwhile, referring to FIGS. 3 and 4, the airbag of the present invention includes: a diffuser 200 distributing gas supplied into the airbag cushion 100 in the unfolded direction of the airbag cushion 100; and an inactive area A3 configured to be unfilled with the gas and guiding the gas distributed through the diffuser 200 toward the protruding chamber 110.

Specifically, the diffuser 200 is provided in a rear portion of a lower unfolded area A2 of the airbag cushion 100; the protruding chamber 110 is provided in an upper unfolded area A1 of the airbag cushion 100; and the inactive area A3 is provided in a center portion between the upper unfolded area A1 and the lower unfolded area A2 in a vertical longitudinal direction. Therefore, a structure in which the gas distributed from the diffuser 200 is guided upward is provided.

For example, an inflator is connected to the diffuser 200 and the diffuser 200 distributes gas generated from the inflator into the airbag cushion 100.

Specifically, a distributor of the diffuser 200 may be formed vertically or may be formed to be open at only an upper portion thereof. When the distributor of the diffuser 200 is formed vertically, an upper portion of the distributor has a sectional area wider than a sectional area of a lower portion thereof, so that the gas introduced through the diffuser 200 is quickly supplied to the upper portion of the airbag cushion.

Then, the inactive area A3 where the opposite side panels are sewn and the airbag cushion is not expanded is provided between the diffuser 200 and the protruding chamber 110. Herein, the inactive area A3 is formed vertically toward the protruding chamber 110 at a location deviated from the upper portion of the diffuser 200. Therefore, the gas discharged through the diffuser 200 is guided directly upward to the protruding chamber 110, so that the protruding chamber 110 is quickly unfolded.

Hereinbelow, the unfolding operation of the center side airbag according to the present invention will be described.

When a side collision of a vehicle occurs, an operation command of the center side airbag is applied, the inflator explodes and gas generated by the inflator is supplied into the diffuser 200.

The inactive area A3 guides the gas of the inflator supplied into the diffuser 200 and the gas is quickly supplied toward the protruding chamber 110 at the upper portion of the airbag cushion.

As the protruding chamber 110 is quickly expanded and unfolded together with the airbag cushion 100, the head of the front passenger is supported by the rear portion of the protruding chamber 110 and is protected.

Specifically, as the protruding chamber 110 is formed in the form in which the protruding volume thereof is reduced in the rear to front direction, the head of the front passenger supported by the rear portion of the protruding chamber 110 is guided toward the front portion of the airbag cushion 100 along the outer surface of the protruding chamber 110.

Therefore, as falling of the head of the front passenger rearward of the airbag cushion 100 is prevented, the risk of a secondary collision between the driver and the front passenger is prevented.

As described above, according to the present invention, the protruding chamber 110 is provided at a portion of the airbag cushion 100 toward the head of the front passenger seat, so that restriction of the transverse movement of the front passenger and quick supporting for the head of the front passenger are performed and the front passenger is stably protected.

In addition, as the protruding volume of the protruding chamber 110 is gradually reduced forward, the head of the front passenger is guided toward the front portion of the airbag cushion 100 along the inclined surface of the protruding chamber 110. Accordingly, the protruding chamber 110 restricts the head of the front passenger from falling behind the airbag cushion 100, thereby preventing a risk of a secondary collision between the driver and the front passenger.

Although the preferred embodiment of the present invention has been disclosed for illustrative purposes, those skilled in the art will appreciate that various modifications, additions, and substitutions are possible, without departing from the spirit and scope of the present invention.

What is claimed is:

1. A center side airbag comprising:
   an airbag cushion configured to be unfolded between a driver seat and a front passenger seat; and
   a protruding chamber configured to be unfolded by a front passenger seat-side portion of the airbag cushion protruding toward a passenger in the front passenger seat,
   the airbag cushion comprising a front passenger seat-side side panel and a driver seat-side side panel that overlap each other, and
   the front passenger seat-side side panel has a wider area than an area of the driver seat-side side panel, so that the protruding chamber is configured to be folded toward the front passenger seat.

2. The center side airbag of claim 1, wherein the protruding chamber is configured to be unfolded toward a head part of the passenger in the front passenger seat.

3. The center side airbag of claim 2, wherein the protruding chamber is configured such that a protruding volume is gradually reduced in a forward direction.

4. The center side airbag of claim 3, wherein the protruding chamber is configured to support the head part of the passenger in the front passenger seat and then guide the head part to a front portion of the airbag cushion in response to a reduction of the protruding volume of the protruding chamber.

5. The center side airbag of claim 1, wherein a portion of the front passenger seat-side side panel is vertically folded; and
   in an unfolding process of the airbag cushion, a folded portion of the front passenger seat-side side panel is unfolded to become the protruding chamber.

6. The center side airbag of claim 5, wherein a protruding volume of the protruding chamber is determined by a folded length of the folded portion.

7. The center side airbag of claim 5, wherein the folded portion is configured to connect a forefront portion to a rearmost portion of the airbag cushion.

8. The center side airbag of claim 5, wherein the folded portion is folded such that a vertical length thereof is gradually shortened in a rear to front direction.

9. A center side airbag of claim 2, further comprising:
   an airbag cushion configured to be unfolded between a driver seat and a front passenger seat;
   a protruding chamber configured to be unfolded by a front passenger seat-side portion of the airbag cushion protruding toward a passenger in the front passenger seat and configured to to be unfolded toward a head part of the passenger in the front passenger seat;
   a diffuser configured to distribute gas supplied into the airbag cushion in an unfolded direction of the airbag cushion; and
   an inactive area configured to be unfilled with gas and to guide the gas distributed through the diffuser toward the protruding chamber.

10. The center side airbag of claim 9, wherein the diffuser is provided in a rear portion of a lower unfolded area of the airbag cushion;
    the protruding chamber is provided in an upper unfolded area of the airbag cushion; and
    the inactive area is formed in a vertical longitudinal direction at a center portion between the upper unfolded area and the lower unfolded area, and which is configured to guide the gas distributed by the diffuser upward.

* * * * *